United States Patent [19]

Spakowski et al.

[11] Patent Number: 5,013,930

[45] Date of Patent: May 7, 1991

[54] REMOTE CONTROL LEVER MODULE

[75] Inventors: Joseph G. Spakowski, Rochester; Donald D. Stoltman, Henrietta, both of N.Y.

[73] Assignee: General Motors Corporation, Detroit, Mich.

[21] Appl. No.: 330,251

[22] Filed: Mar. 29, 1989

[51] Int. Cl.[5] .......... B60L 1/00

[52] U.S. Cl. .......... 307/10.1; 338/32 R; 200/61.89

[58] Field of Search .......... 307/9.1, 10.1; 361/143, 361/144; 338/32 H, 32 R; 200/61.89, 61.9, 332

[56] References Cited

U.S. PATENT DOCUMENTS

| | | | |
|---|---|---|---|
| 3,695,379 | 10/1972 | Veilleux | 200/61.89 |
| 3,757,758 | 9/1973 | Stoltman | 123/198 |
| 3,958,677 | 5/1976 | Spanelis | 200/61.89 |
| 4,006,402 | 2/1977 | Mincozzi | 338/321 R |
| 4,088,977 | 5/1978 | Bowman, Jr. et al. | 338/32 R |
| 4,117,401 | 9/1978 | Glauert | 324/208 |
| 4,392,375 | 7/1983 | Eguchi et al. | 73/118.1 |
| 4,528,590 | 7/1985 | Bisacquino et al. | 338/153 |
| 4,566,418 | 1/1986 | Yamamoto et al. | 123/479 |
| 4,601,271 | 7/1986 | Ejiri et al. | 123/361 |
| 4,616,504 | 10/1986 | Overcash et al. | 73/118.1 |
| 4,640,248 | 2/1987 | Stoltman | 423/399 |
| 4,733,214 | 3/1988 | Andresen | 338/32 R |
| 4,853,556 | 8/1989 | Pfalzgraf et al. | 200/61.89 |
| 4,869,220 | 9/1989 | Imoehl | 123/399 |

FOREIGN PATENT DOCUMENTS

| | | |
|---|---|---|
| 872180 | 6/1942 | France . |
| 1452516 | 9/1966 | France . |
| 60-045729 | 7/1985 | Japan . |

OTHER PUBLICATIONS

Petersen, A. J., "The Magnetoresistive Sensor a versatile device for transducers," Philips Electrical Components and Materials Division of Amperex Electronic Corporation, 1984.

*Primary Examiner*—J. R. Scott
*Assistant Examiner*—Jeffrey A. Gaffin
*Attorney, Agent, or Firm*—Gordon F. Belcher

[57] ABSTRACT

A remote control lever module comprising a support including a bearing and a lever including a shaft pivotably supported by the bearing for oscillation about the shaft axis between a nonactuating position and actuating positions. The lever further includes an actuating arm extending from the shaft at an angle thereto for moving the shaft between the nonactuating position and the actuating positions and a return spring acting on the lever when the shaft is in the actuating positions to urge the shaft to the nonactuating position. Magnets are fixed on the shaft and movable therewith to provide a movable magnetic field of varying strength in an effective zone adjacent one side of the shaft. A magnetic field sensor is fixed to the support adjacent to the shaft in the effective zone of the magnetic field and operative to sense the variation in strength of the magnetic field at various positions of the shaft and to form a readable output signal proportional to the variations for indicating the angular position of the shaft. The lever module may also have a lever force switch engageable by the shaft to close the switch when the actuating arm urges the shaft into the actuating positions.

20 Claims, 2 Drawing Sheets

FIG. 3
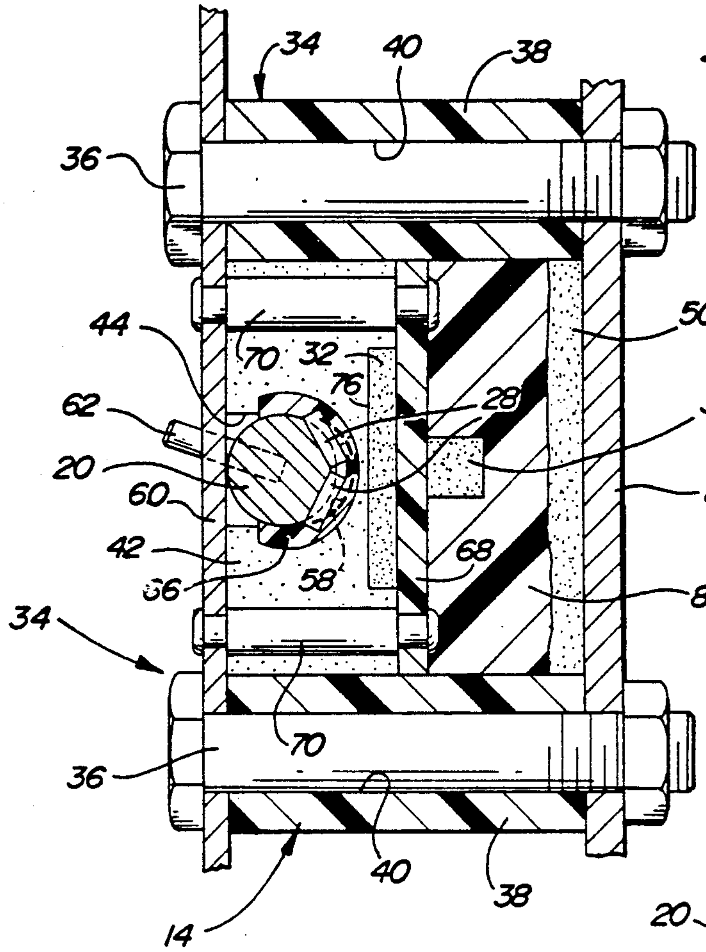
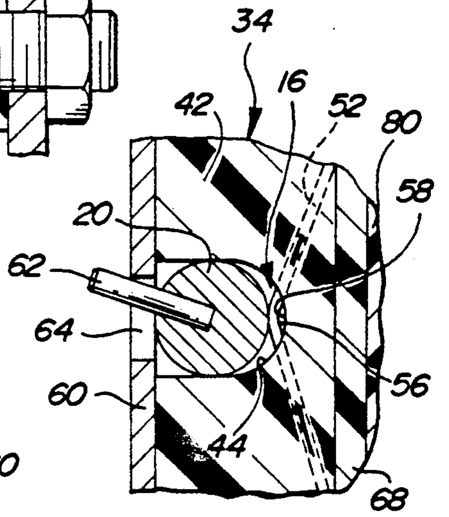
FIG. 5
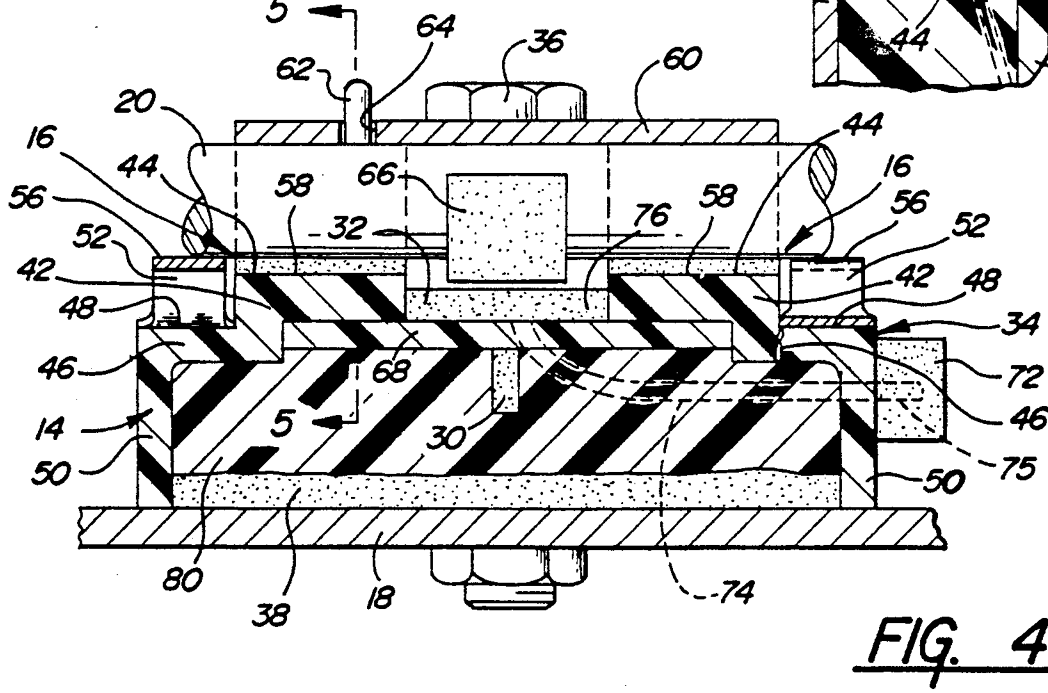
FIG. 4

REMOTE CONTROL LEVER MODULE

TECHNICAL FIELD

This invention relates to a remote control lever module for sensing movement of a lever. More particularly, the invention relates to a remote control lever module for sensing the angular position and operator engagement of a pedal lever for a drive-by-wire vehicle control system.

BACKGROUND

Vehicle control systems that do not require a mechanical linkage between the operator controlled pedals and the components which are controlled by the pedals are known in the art, and are sometimes referred to as drive-by-wire control systems. The engine control system is one system which can include a drive-by-wire engine controller to obviate the need for a mechanical linkage between the accelerator pedal and the engine. One type of drive-by-wire engine controller known in the art includes a pedal position sensor which senses the angular position of the pedal lever which pivotably supports the accelerator pedal. The pedal position sensor produces an electric signal proportional to the angular position of the pedal lever. This signal is then sent to an electronic control module (ECM) which regulates the output of the engine.

Some of the pedal position sensors known in the art utilize potentiometers to sense the angular position of the pedal lever. The potentiometer typically has one member connected to the pedal lever and another member connected to a surface which is stationary with respect to the vehicle, such as the bulkhead. Several problems are associated with this type of sensor. Potentiometers generally have at least one pair of surfaces in direct sliding contact. This can cause wear between the surfaces in contact and degradation in performance of the sensor. Moreover, friction is produced between the surfaces in contact and, depending on its magnitude, can require additional effort by the vehicle operator to depress the pedal or a spring to counteract the friction force. Periodic adjustment of the pedal lever can be required if the friction force is sufficiently large and variable.

The potentiometer must be shielded from the dirt and chemicals which can be on the operator's shoes and from inadvertent jolts to the potentiometer by the operator. Shielding such a potentiometer can be difficult since flexible shielding must be used due to the variations in size of the potentiometer associated with movement of the pedal lever.

It is also known to provide the drive-by-wire controller with a pedal force sensor which is able to sense whether the angular displacement of the pedal lever is caused by the application of an external force to the lever, such as the operator stepping on the pedal. The pedal force sensor is connected to the ECM and produces an electrical signal to indicate whether a force is sensed by the sensor. The ECM is programmed to sense this signal and cause the engine to idle if there is no force sensed. This reduces the possibility of unintended movement of the vehicle by a reason other than the operator stepping on the accelerator pedal.

Several problems are associated with drive-by-wire controllers having pedal position sensors and pedal force sensors. The pedal position and force sensors are sometimes attached to different parts of the pedal lever and vehicle increasing the effort and expense necessary to manufacture and install the lever. A further problem associated with separate attachments of the sensors is that each sensor must be separately shielded. The separate locations of the pedal position and force sensors on the pedal lever also contribute to increased vehicle assembly effort and expense since a separate set of wires for each sensor must be routed from the respective sensor locations through the passenger and engine compartments to the ECM.

SUMMARY OF THE INVENTION

The present invention provides a remote control lever module for sensing the angular position of a lever. Such control lever modules are particularly suited for use in drive-by-wire vehicle control systems for sensing the angular position and actuation of a pedal lever.

In its simplest form, the remote control lever module comprises a support including a pedal base and a bearing. The bearing is supported on the pedal base. A lever including a shaft is pivotably supported by the bearing for oscillation about the shaft axis between a nonactuating position and various actuating positions. The lever further includes an actuating arm extending from the shaft at an angle thereto for moving the shaft between the nonactuating position various actuating positions, and a return spring, acting on the lever when the shaft is in the various actuating positions to urge the shaft to the nonactuating position. Magnets are fixed on the shaft and movable therewith to provide a movable magnetic field of varying strength in an effective zone adjacent one side of the shaft with the effective zone being adjacent to the pedal base. A magnetic field sensor is fixed to the pedal base adjacent to the shaft in the effective zone of the magnetic field and operative to sense the variation in strength of the magnetic field at the nonactuating position and the various actuating positions of the shaft and to form a readable output signal proportional to the variations for indicating the angular position of the shaft.

The magnets fixed on the shaft and the magnetic field sensor fixed to the support enable sensing of the angular position of the shaft without direct sliding contact between members of the sensor in contrast to a potentiometer. The friction associated with such direct sliding contact and the resulting resistance to angular movement of the shaft and degraded sensor performance are therefore not present.

Shielding the sensor elements is also made easier, as compared to a potentiometer, by using the magnets in combination with the magnetic field sensor since there is no mechanical connection between the two components. The magnets and magnetic field sensor therefore do not require flexible shielding since there is no mechanical connection between them that changes in shape as the lever moves.

The remote control lever module may also have a lever force switch engageable by the shaft to close the switch when the actuating arm urges the shaft into the actuating positions.

The proximity of the lever force switch to the magnetic field sensor enables the sensor and switch to be manufactured in an integrated assembly which offers a number of advantages. First, separate shielding of the sensor and switch is not required since shielding the single integrated assembly will protect both of the components. Second, mounting the sensor and switch, for example, in the passenger compartment of a vehicle, is also easier since only the integrated assembly need be attached as compared to two separate sensors. Finally, connection of the lever module to, for example, the ECM of a vehicle, is facilitated since only a single set of wires needs to be routed from the integrated assembly through the passenger and engine compartments to the ECM.

These and other features and advantages of the invention will be more fully understood from the following description of certain specific embodiments of the invention taken together with the accompanying drawings.

BRIEF DRAWING DESCRIPTION

In the drawings:

FIG. 3 is a cross sectional view through the lever module generally in the plane indicated by line 3—3 of FIG. 2;

FIG. 4 is a cross sectional view through the lever module generally in the plane indicated by line 4—4 of FIG. 2; and FIG. 5 is a fragment of a cross sectional view through the lever module generally in the plane indicated by line 5—5 of FIG. 4.

Corresponding reference characters indicate corresponding parts throughout the several views of the drawings.

DETAILED DESCRIPTION

Figure 1:
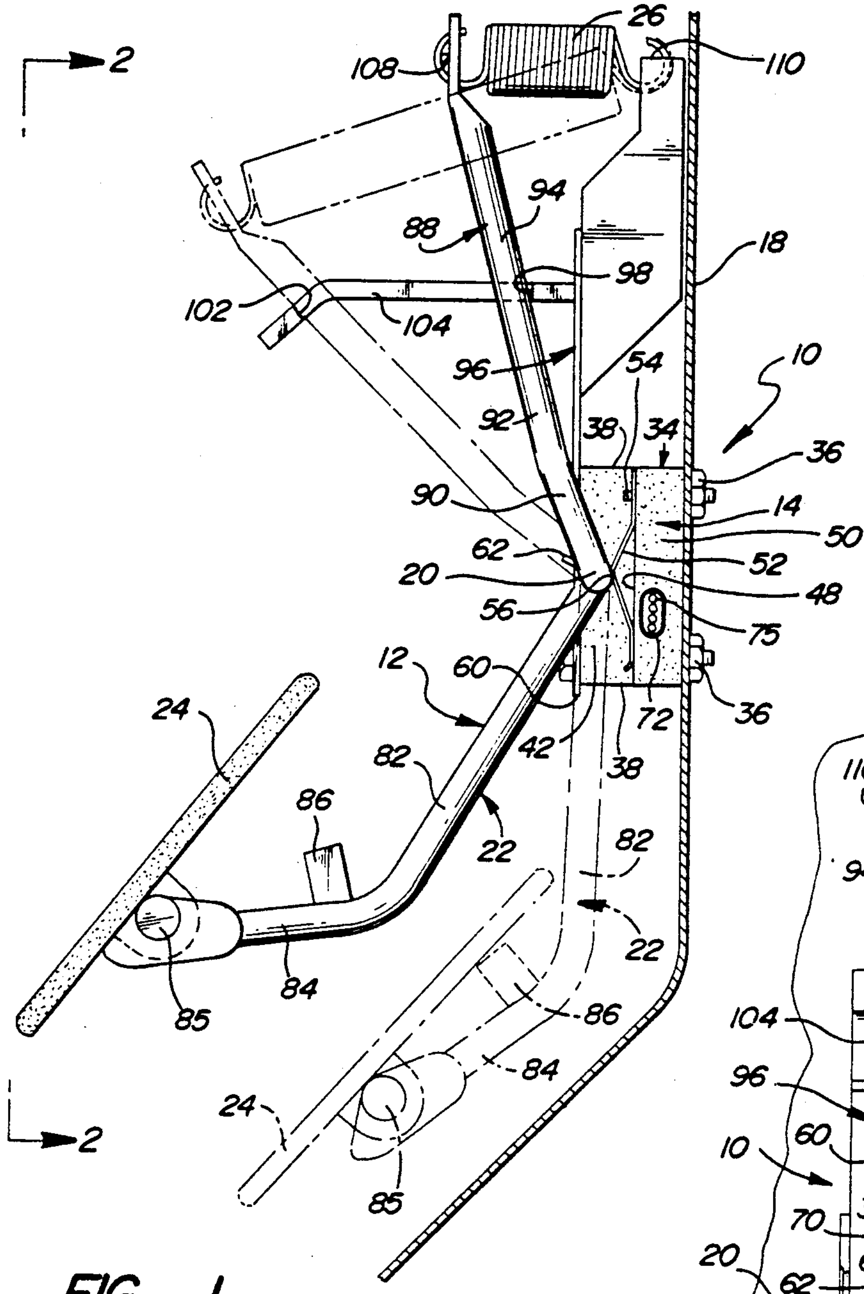
FIG. 1 is a side elevational view of a remote control lever module in accordance with the present invention showing the pedal lever in the idle position (in solid lines) and an off-idle position (in phantom)

Referring now to the drawings in detail, numeral 10 generally indicates an embodiment of a remote control lever module of the present invention. The embodiment depicted includes a pedal lever 12 controlled by the vehicle operator and is able to form a readable output signal proportional to movement of the pedal lever. The output signal is used by a drive-by-wire engine control system for a vehicle. While other embodiments of the remote control lever module may be used to sense movement of other levers, the lever module is particularly suited for use with a pedal lever thereby making the pedal module 10 an apt embodiment for illustrating the principles of this invention.

Briefly, the pedal module 10 includes a support 14 having a pedal base 34 and a bearing 16. The bearing 16 is supported on the pedal base 34. The support 14 is mounted on the part of a bulkhead 18 of a vehicle which faces the operator. The pedal module 10 includes a pedal lever 12 comprising a shaft 20 pivotably supported by the bearing 16 for oscillation about the shaft axis between an idle position and various off-idle positions. An actuating arm 22 extends from one end of the shaft 20 at an angle to the shaft and has a pedal 24 connected to its end. The idle position of the shaft 20 corresponds to the position of the pedal lever 12 when the operator does not depress the pedal 24 and the various off-idle positions of the shaft correspond to positions of the pedal lever when the operator depresses the pedal 24. The pedal lever 12 further includes return means comprising a return spring 26 which acts on the pedal lever 12 to urge the shaft toward the idle position.

The pedal module 10 has a pair of magnets 28 fixed on the shaft 20 and movable therewith to provide a movable magnetic field of varying strength in an effective zone adjacent one side of the shaft with the effective zone being adjacent to the pedal base 34. A magnetic field sensor 30 is fixed to the pedal base 34 adjacent to the shaft 20 in the effective zone of the magnetic field. The magnetic field sensor 30 is operative to sense the variation in strength of the magnetic field at the idle position and the various off-idle positions of the shaft 20 and to form a readable output signal proportional to the variations for indicating the angular position of the shaft. The pedal module 10 may also include a pedal force switch 32 engageable by the shaft 20 to close the switch when the actuating arm 22 urges the shaft to the off-idle positions. The pedal force switch 32 is operative to form a readable output signal to indicate whether the switch is opened or closed.

Figure 2:
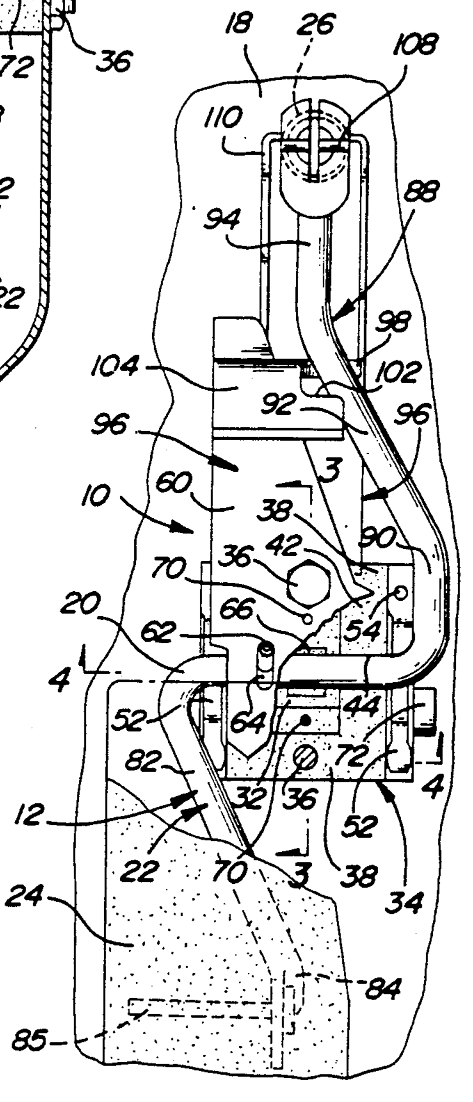
FIG. 2 is a front elevational view of the lever module generally in the plane indicated by the line 2—2 of FIG. 1.

More specifically, the pedal support 14 comprises a pedal base 34 which is secured to the bulkhead 18 by a pair of bolts 36 as shown in FIGS. 2 and 3. The pedal base 34 is constructed of plastic or other nonmagnetic material to reduce interference in the magnetic field acting on the magnetic field sensor 30. The pedal base 34 includes a pair of end walls 38 extending from the bulkhead 18 generally parallel to the shaft 20 on opposite sides thereof. The end walls 38 are generally equally spaced from the shaft 20. Each end wall 38 has a bore 40 through which a bolt 36 extends for connecting the pedal module 10 to the bulkhead 18, as shown in FIG. 3. The pedal base 34 also includes a pair of integral support blocks 42, each having the shape of a rectangular prism. Each support block 42 extends between the end walls 38 generally adjacent the outer edges of the end walls. Each support block 42 has a transverse generally U-shaped recess 44 in the face of the block opposite the bulkhead 18. The recesses 44 are coaxial so that the shaft 20 may be received therein as shown in FIGS. 2, 3 and 5. An integral step flange 46 extends outwardly from the side of each support block 42 facing the bulkhead 18. Each step flange 46 is generally parallel to the bulkhead 18 forming a step 48 adjacent the outer side of each support block 42. An integral base flange 50 extends from each step flange 46 to the bulkhead 18, as shown in FIG. 4.

A biasing spring 52 comprising a leaf spring is mounted on each step 48 generally parallel to the support blocks 42 and bulkhead 18 as shown in FIGS. 1, 4 and 5. Each biasing spring 52 is held to the step 48 by a rivet 54 or the like extending through one end of the spring and the adjacent step. Each biasing spring 52 has a raised portion with an apex 56 generally midway between its ends as shown in FIGS. 1 and 5. Each biasing spring 52 is located on the respective step 48 so that the apexes 56 are generally adjacent the inner curve 58 of the recesses 44. The biasing springs 52 have sufficient height so that each apex 56 extends away from the respective step 48 beyond the inner curve 58, as shown in FIG. 5.

The shaft 20 is received in the recesses 44 and extends across the width of the pedal base 34 as shown in FIGS. 3 and 4. Due to the height of the biasing springs 52, the shaft 20 is supported on the apexes 56 of the springs when in the idle position. As a force is applied to the actuating arm 22 urging the shaft 20 to the off-idle positions, as when an operator depresses the pedal 24, the shaft moves toward the bulkhead 18 against the biasing springs 52 causing the springs to yield and deflect. The biasing springs 52 normally urge the shaft 20 away from the pedal force switch 32. If the force applied to the actuating arm 22 is sufficiently large, the biasing springs 52 will yield and deflect sufficiently so that the shaft 20 engages the inner curves 58 which then support the shaft. The bearing 16 is therefore constituted by the biasing springs 52 or the recesses 44 in the support blocks 42, depending on the position of the shaft 20 with respect to the bulkhead 18.

The biasing springs 52 are constructed to yield before the return spring 26 which acts on the pedal lever 12 so that, when the pedal 24 on the actuating arm 22 is depressed, the biasing springs will deflect prior to rotation of the shaft 20 from the idle to off-idle positions.

The support 14 further comprises a mounting bracket 96 having a pedal plate 60 which mates with the outer surface of the support blocks 42 enclosing the recesses 44 to hold the shaft 20 therein as shown in FIG. 3. The mounting bracket 96 is constructed of steel to absorb any stray magnetic fields outside the pedal base 34 thereby to reduce interference by such stray fields in the magnetic field acting on the magnetic field sensor 30. The pedal plate 60 is held against the support blocks 42 by the bolts 36. The shaft 20 has a pin 62 extending generally outward through a longitudinal slot 64 in the pedal plate 60. The pin 62 does not interfere with rotation of the shaft 20 between the idle and off-idle positions since such movement causes rotational displacement of the pin 62 which is permitted by the slot 64. Transverse movement of the shaft 20 with respect to the pedal plate 60, however, causes the pin 62 to engage the sides of the slot 64. Such movement is thereby obstructed to facilitate maintenance of the magnets 28 in a predetermined alignment with respect to the magnetic field sensor 30.

The pair of magnets 28 are held in recesses in the shaft 20 by a plastic magnet holder 66 attached to the shaft by an adhesive or the like as shown in FIG. 3. Adhesive may also be applied to the inner surface of each magnet 28 to form a direct bond between each magnet and the shaft 20. The outer portions of the magnets 28 extend into recesses in the magnet holder 66 enabling the holder to be generally flush with the shaft 20. The magnets 28 are thereby able to provide the movable magnetic field described above. The magnets 28 extend circumferentially around the shaft 20 in end-to-end relation on the side of the shaft facing the bulkhead 18. The magnets 28 are positioned between the support blocks 42 so that the effective zone of the magnetic field extends between the support blocks.

A circuit board 68 is mounted on the inner surfaces of the support blocks 42 and held against the blocks by a pair of spacer studs 70 which extend from the pedal plate 60 to the circuit board between the support blocks as shown in FIG. 3. The magnetic field sensor 30 is mounted on the side of the circuit board 68 facing the bulkhead 18 by an adhesive or the like. The magnetic field sensor 30 is located on the circuit board 68 between the support blocks 42 generally midway between the end walls 38 in the effective zone of the magnetic field. The magnetic field sensor 30 is thereby able to sense the variation in strength of the magnetic field at various positions of the shaft 20. The circuit board 68 is nonmagnetic so as to not affect the magnetic field acting between the magnets 28 and the magnetic field sensor 30.

The magnetic field sensor 30 comprises a magnetoresistive device operative to form a readable output signal proportional to the variations in the magnetic field for indicating the angular position of the shaft 20. Since the magnets 28 are fixed on the shaft 20, the movement of the magnetic field is proportional to the angular displacement of the shaft 20. The output signal of the magnetoresistive device can therefore be correlated to the angular displacement of the shaft 20.

The magnetic field sensor 30 is electrically connected to the circuit board 68. The circuit board 68 contains a circuit programmed to process the signal formed by the magnetic field sensor 30 to facilitate sensing of the signal by an ECM (not shown), described below. The circuit board 68 is electrically connected to a connector 72 by wires 74 which extend between the two components. The connector 72 is located in one of the base flanges 50 generally adjacent the recess 44 in the adjacent support block 42 as shown in FIG. 4. The connector 72 is electrically connected to the ECM so that it can sense the output signal from the magnetic field sensor 30. The ECM also produces signals which are sensed by the circuit board 68 to facilitate operation of the magnetic field sensor 30 and pedal force switch 32. At least four wires 74 are therefore required to electrically connect the circuit board 68 to the connector 72 with the connector having four discrete electrical contacts 75 corresponding to each wire available for connection to the ECM.

The pedal force switch 32 comprises a resilient pad 76 mounted on the side of the circuit board 68 facing the shaft 20 as shown in FIGS. 3 and 4. The resilient pad 76 comprises a flexible enclosure having opposite sides with metallic contacts (not shown) being connected to the inner surfaces of each of the sides. The pad 76 is positioned between the support blocks 42 generally midway between the end walls 38 so that the pad is opposite the magnet holder 66. The pedal force switch 32 is nonmagnetic so as to not affect the magnetic field acting between the magnets 28 and the magnetic field sensor 30. The pad 76 has a sufficient thickness so that when the shaft 20 is urged against the biasing springs 52 to cause them to deflect, the magnet holder 66 engages the pad 76 causing the pedal force switch 32 to close before the shaft 20 engages the inner curves 58. When the pad 76 is sufficiently compressed by the shaft 20, the contacts on the inner surfaces of the pad engage with one another enabling the pedal force switch 32 to form a readable output signal. The output signal of the pedal force switch 32 can therefore be correlated to whether or not the shaft 20 is being urged against the biasing springs 52.

The pedal force switch 32 is electrically connected to the circuit board 68. The circuit board 68 contains a circuit programmed to process the signal formed by the pedal force switch 32 to facilitate sensing of the signal by the ECM, described below. The signal formed by the pedal force switch 32 is sensed by the ECM via the connector 72.

Potting material 80 shown in FIGS. 3 and 4 encases the side of the circuit board 68 facing the bulkhead 18 and the magnetic field sensor 30 attached thereto. The potting material 80 electrically insulates the circuit board 68 and magnetic field sensor 30 from other electrically conductive components which they may contact. The potting material 80 also protects the circuit board 68 and magnetic field sensor 30 from the surrounding environment.

The support 14 is mounted on the part of the bulkhead 18 of a vehicle which faces the operator. The support 14 is located a sufficient distance above the floor (not shown) so that, when a driver sits in the vehicle, the pedal 24 is adjacent the feet of the driver and the driver can step on the pedal in a manner similar to that used in a conventional vehicle. The lateral spacing of the support 14 in relation to the side of the car is determined by the control system associated with the pedal module 10. For example, if the pedal module 10 is to control the vehicle acceleration, the support 14 is located so that it is generally adjacent the right foot of the operator where the accelerator pedal is typically located.

As shown in FIG. 2, the actuating arm 22 extends from one end of the shaft 20 and has a pedal 24 connected to its end. The actuating arm 22 has a slanted portion 82 extending generally downward from the shaft 20 at an angle to the shaft toward the transverse central axis of the shaft. The actuating arm 22 has a support portion 84 extending downward from the slanted portion 82 generally perpendicular to the shaft 20. The axis of the support portion 84 generally intersects the axes of the bolts 36 to reduce twisting of the support 14 away from the bulkhead 18 when a force is applied to the actuating arm 22. The pedal 24 is pivotably connected to a pin 85 attached to the support portion 84 as shown in FIGS. 1 and 2. A pedal stop 86 extends from the side of the support portion 84 facing the pedal 24.

Due to the attachment of the actuating arm 22 to the shaft 20, movement of the pedal 24 toward or away from the bulkhead 18 causes the shaft to oscillate about its axis. The connection of the pedal 24 to the support portion 84 results in the pedal pivoting toward the support portion into engagement with the pedal stop 86 when the pedal is depressed as shown in FIG. 1 (in phantom).

The pedal lever 12 further comprises a return arm 88 extending from the other end of the shaft 20. The return arm 88 has a base portion 90 extending generally upward from the shaft 20 generally perpendicular thereto as shown in FIG. 2. The return arm 88 has a slanted portion 92 extending generally upward from the base portion 90 at an angle to the base portion toward the transverse central axis of the shaft 20. The return arm 88 has a connector portion 94 extending upward from the slanted portion 92 generally perpendicular to the shaft 20. The axis of the connector portion 94 generally intersects the axes of the bolts 36 to reduce twisting of the support 14 away from the bulkhead 18 when the return spring 26 acts on the return arm 88. Due to the attachment of the return arm 88 to the shaft 20, oscillation of the shaft about its axis causes the return arm to move away from or toward the bulkhead 18. The connector portion 94 is connected to the return spring 26 which acts on the return arm 88 to urge the shaft toward the idle position.

The mounting bracket 96 extends from the pedal base 34 generally upward and parallel to the bulkhead 18 as shown in FIGS. 1 and 2. A stop arm 104 extends away from the mounting bracket 96 toward the upper end of the slanted portion 92 generally perpendicular to the bulkhead 18. The stop arm 104 is offset from the return arm 88 to avoid interfering with its movement. A support member (not shown), such as a flange or plate, may be attached to the stop arm 104 to strengthen it. An idle stop 98 comprising an integral idle finger extends from the stop arm 104 generally parallel to the bulkhead 18 toward the return arm 88. The idle stop 98 is generally adjacent the mounting bracket 96 and has sufficient length to cross the plane of rotation of the return arm 88 so that sufficient movement of the return arm toward the bulkhead will result in the return arm engaging the finger, as shown in FIG. 1 (in solid lines). Movement of the return arm 88 toward the bulkhead 18 and the corresponding rotation of the shaft 20 are thereby limited.

An off-idle stop 102 comprising an integral off-idle finger extends from the end of the stop arm 104 generally parallel to the bulkhead 18 toward the return arm 88. The off-idle stop 102 has sufficient length to cross the plane of rotation of the return arm 88 so that sufficient movement of the return arm away from the bulkhead 18 will result in the return arm engaging the off-idle finger as shown in FIG. 1 (in phantom). Movement of the return arm 88 away from the bulkhead 18 and the corresponding rotation of the shaft 20 are thereby limited.

The return spring 26 is connected between the return arm 88 and the mounting bracket 96 as shown in FIGS. 1 and 2. Each end of the return spring 26 is formed into a hook with one end being connected to a transverse pin 108 attached to the end of the connector portion 94. The opposite end of the return spring 26 is connected to a U-shaped member 110 formed in the upper end of the mounting bracket 96. When the shaft 20 is angularly displaced from the idle position to an off-idle position, the return arm 88 is caused to move away from the bulkhead 18 thereby stretching the return spring 26. The return spring 26 resists such stretching thereby urging the return arm 88 back into engagement with the idle stop 98 causing the shaft 20 to return to the idle position.

The ECM is programmed to process the signals received from the magnetic field sensor 30 and pedal force switch 32 and form an output signal which controls the engine output. The ECM produces a signal which causes the engine to idle when it receives a signal from the magnetic field sensor 30 produced when the return arm 88 is engaged with the idle stop 98. Thus, the idle position of the shaft 20 is established as the position of the shaft 20 when the return arm 88 engages the idle stop 98. When the ECM receives a signal from the pedal force switch 32 indicating that the switch is open, the ECM produces a signal which causes the engine to idle since, presumably, the operator is not depressing the pedal 24. The ECM is further programmed so that, when it receives a signal from the magnetic field sensor 30 produced by rotation of the shaft 20 and a signal indicating that the pedal force switch 32 is closed, the ECM forms a signal which causes the engine output to increase in proportion to the amount of rotation since the amount of rotation is proportional to the amount the operator depresses the pedal 24. The programming of the ECM requires that the pedal force switch 32 be closed for the engine output to increase since closure of the switch indicates that the operator is depressing the pedal 24. This reduces the possibility of the engine output increasing even though the operator is not depressing the pedal 24.

In operation, the vehicle operator depresses the pedal 24 toward the bulkhead 18 when an increase in engine output is desired. As shown in FIG. 1 (in phantom), displacement of the pedal 24 causes the actuating arm 22 to move toward the bulkhead 18, the shaft 20 to rotate to an off-idle position and to move toward the bulkhead, and the return arm 88 to move away from the bulkhead thereby stretching the return spring 26. Movement of the shaft 20 toward the bulkhead 18 causes the biasing springs 52 to deflect and the pedal force switch 32 to close. This, combined with rotation of the shaft 20 away from the idle position, causes the ECM to form a signal causing the engine output to increase. Continued depression of the pedal 24 causes the engine output to further increase and the return arm 88 to move further away from the bulkhead 18 until the return arm engages the off-idle stop 102. At that point, continued depression of the pedal 24 and rotation of the shaft 20 is obstructed thereby limiting further increase in engine output.

With the shaft 20 in an off-idle position, the return spring 26 urges the return arm 88 toward the bulkhead 18. Therefore, if the operator removes his foot from the pedal 24, the return arm 88 moves back into engagement with the idle stop 98 as shown in FIG. 1 (in solid lines) and the shaft 20 returns to the idle position. In addition, if the operator removes his foot from the pedal 24, the biasing springs 52 urge the shaft 20 away from the bulkhead 18 causing the pedal force switch 32 to open. This signals the ECM to cause the engine to idle even before the shaft 20 returns to the idle position and avoids off-idle engine operation when the operator is not depressing the pedal 24.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A remote control lever module comprising:

a support means including a pedal base and a bearing means, said bearing means being supported on said pedal base;

a lever including a shaft pivotably supported by said bearing means for oscillation about the shaft axis between a nonactuating position and various actuating positions, an actuating arm extending from said shaft at an angle thereto for moving said shaft between said nonactuating position and said various actuating positions, and return means acting on said lever when said shaft is in said various actuating positions to urge said shaft toward said nonactuating position;

a magnet means fixed on said shaft and movable therewith to provide a movable magnetic field of varying strength in an effective zone adjacent one side of said shaft, said effective zone being adjacent to said pedal base; and a magnetic field sensor fixed to said pedal base adjacent to said shaft in the effective zone of the magnetic field and operative to sense the variation in strength of said magnetic field at said nonactuating position and said various actuating positions of said shaft and to form a readable output signal proportional to said variations for indicating the angular position of said shaft.

2. A remote control lever module as set forth in claim 1 wherein said return means comprises a return spring acting between said lever and said support means.

3. A remote control lever module as set forth in claim 1 wherein said magnetic field sensor comprises a magnetoresistive device.

4. A remote control lever module comprising:

a support means including a bearing means;

a lever including a shaft pivotably supported by said bearing means for oscillation about the shaft axis between a nonactuating position and actuating positions, an actuating arm extending from said shaft at an angle thereto for moving said shaft between said nonactuating position and said actuating positions, and return means acting on said lever when said shaft is in said actuating positions to urge said shaft toward said nonactuating position;

a magnet means fixed on said shaft and movable therewith to provide a movable magnetic field of varying strength in an effective zone adjacent one side of said shaft; and a magnetic field sensor fixed to said support means adjacent to said shaft in the effective zone of the magnetic field and operative to sense the variation in strength of said magnetic field at various positions of said shaft and to form a readable output signal proportional to said variations for indicating the angular position of said shaft; and further comprising a lever force switch engageable by said shaft to close said switch when said actuating arm urges said shaft into said actuating positions.

5. A remote control lever module as set forth in claim 4 and further comprising a biasing spring acting between said shaft and said support means to urge said shaft away from said lever force switch, said biasing spring being constructed so that, when said actuating arm moves said shaft from said nonactuating position to said actuating positions, said biasing spring yields prior to said return means to provide actuation of said lever force switch when said actuating arm urges said shaft into said actuating positions.

6. A remote control lever module as set forth in claim 4 and further comprising a nonmagnetic circuit board mounted adjacent said shaft and containing a circuit electrically connected with said magnetic field sensor to process its signal, said circuit board having said lever force switch mounted on the side facing said shaft and said magnetic field sensor mounted on the side facing away from said shaft wherein said lever force switch is nonmagnetic so as not to affect said magnetic field acting between said magnet means and said magnetic field sensor.

7. A remote control lever module as set forth in claim 6 and further comprising an electrically insulating potting material at least partly encasing said circuit board for protection against the surrounding environment.

8. A remote control lever module comprising:

a support means including a bearing means;

a lever including a shaft pivotably supported by said bearing means for oscillation about the shaft axis between a nonactuating position and actuating positions, an actuating arm extending from said shaft at an angle thereto for moving said shaft between said nonactuating position and said actuating positions, and return means acting on said lever when said shaft is in said actuating positions to urge said shaft toward said nonactuating positions;

a magnet means fixed on said shaft and movable therewith to provide a movable magnetic field of varying strength in an effective zone adjacent one side of said shaft; and a magnetic field sensor fixed to said support means adjacent to said shaft in the effective zone of the magnetic field and operative to sense the variation in strength of said magnetic field at various positions of said shaft and to form a readable output signal proportional to said variations for indicating the angular position of said shaft;

wherein said lever further comprises a return arm extending from said shaft at an angle thereto wherein said shaft oscillation causes movement of said return arm and said return means acts on said return arm.

9. A remote control lever module comprising:

a support means including a bearing means;

a lever including a shaft pivotably supported by said bearing means for oscillation about the shaft axis between a nonactuating position and actuating positions, an actuating arm extending from said shaft at an angle thereto for moving said shaft between said nonactuating position and said actuating positions, and return means acting on said lever when said shaft is in said actuating positions to urge said shaft toward said nonactuating position;

a magnet means fixed on said shaft and movable therewith to provide a movable magnetic field of varying strength in an effective zone adjacent one side of said shaft; and a magnetic field sensor fixed to said support means adjacent to said shaft in the effective zone of the magnetic field and operative to sense the variation in strength of said magnetic field at various positions of said shaft and to form a readable output signal proportional to said variations for indicating the angular position of said shaft; and further comprising a first stop on said support means engageable by said lever when said shaft is in said nonactuating position thereby to establish said nonactuating position, and a second stop on said support means engageable by said lever when said shaft is on one of said actuating positions to limit the travel of said lever.

10. A remote control lever module as set forth in claim 9 wherein said support means comprises a mounting bracket carrying said first and second stops, said return means being connected between said mounting bracket and said lever.

11. A pedal module for a drive-by-wire vehicle control system, said pedal module comprising:

a support means including a pedal base and a bearing means, said bearing means being supported on said pedal base, a pedal lever including a shaft pivotably supported by said bearing means for oscillation about the shaft axis between an idle position and various off-idle positions, an actuating arm having a pedal extending from said shaft at an angle thereto for moving said shaft between said idle position and said various off-idle positions, and return means acting on said pedal lever when said shaft is in said various off-idle positions to urge said shaft to said idle position;

a magnet means fixed on said shaft and movable therewith to provide a movable magnetic field of varying strength in an effective zone adjacent on e side of said shaft, said effective zone being adjacent to said pedal base; and a magnetic field sensor fixed to said pedal base adjacent to said shaft in the effective zone of said magnetic field and operative to sense the variation in strength of said magnetic field at said idle position and said various off-idle positions of said shaft and to form a readable output signal proportional to said variations for indicating the angular position of said shaft.

12. A pedal module as set forth in claim 11 wherein said return means comprises a return spring acting between said pedal lever and said support means.

13. A pedal module as set forth in claim 11 wherein said magnetic field sensor comprises a magnetoresistive device.

14. A pedal module for a drive-by-wire vehicle control system, said pedal module comprising:

a support means including a bearing means;

a pedal lever including a shaft pivotably supported by said bearing means for oscillation about the shaft axis between an idle position and off-idle positions, an actuating arm having a pedal extending from said shaft at an angle thereto for moving said shaft between said idle position and said off-idle positions, and return means acting on said pedal lever when said shaft is in said off-idle positions to urge said shaft to said idle position;

a magnet means fixed on said shaft and movable therewith to provide a movable magnetic field of varying strength in an effective zone adjacent one side of said shaft; and a magnetic field sensor fixed to said support means adjacent to said shaft in the effective zone of said magnetic field and operative to sense the variation in strength of said magnetic field at various positions of said shaft and to form a readable output signal proportional to said variations for indicating the angular position of said shaft; and further comprising a pedal force switch engageable by said shaft to close said switch when said actuating arm urges said shaft into said off-idle positions.

15. A pedal module as set forth in claim 14 and further comprising a biasing spring acting between said shaft and said support means to urge said shaft away from said pedal force switch, said biasing spring being constructed so that, when said actuating arm moves said shaft from said idle position to said off-idle positions, said biasing spring yields prior to said return means to provide actuation of said pedal force switch when said actuating arm urges said shaft into said off-idle positions.

16. A pedal module as set forth in claim 14 and further comprising a nonmagnetic circuit board mounted adjacent said shaft and containing a circuit electrically connected with said magnetic field sensor to process its signal, said circuit board having said pedal force switch mounted on the side facing said shaft and said magnetic field sensor mounted on the side facing away from said shaft wherein said pedal force switch is nonmagnetic so as not to affect said magnetic field acting between said magnet means and said magnetic field sensor.

17. A pedal module as set forth in claim 16 and further comprising an electrically insulating potting material at least partly encasing said circuit board for protection against the surrounding environment.

18. A pedal module for a drive-by-wire vehicle control system, said pedal module comprising:

a support means including a bearing means;

a pedal lever including a shaft pivotably supported by said bearing means for oscillation about the shaft axis between an idle position and off-idle positions, an actuating arm having a pedal extending from said shaft at an angle thereto for moving said shaft between said idle position and said off-idle positions, and return means acting on said pedal lever when said shaft is in said off-idle positions to urge said shaft to said idle position;

a magnet means fixed on said shaft and movable therewith to provide a movable magnetic field of varying strength in an effective zone adjacent one side of said shaft; and a magnetic field sensor fixed to said support means adjacent to said shaft in the effective zone of said magnetic field and operative to sense the variation in strength of said magnetic field at various positions of said shaft and to form a readable output signal proportional to said variations for indicating the angular position of said shaft; and wherein said pedal lever further comprises a return arm extending from said shaft at an angle thereto wherein said shaft oscillation causes movement of said return arm and said return means acts on said return arm.

19. A pedal module for a drive-by-wire vehicle control system, said pedal module comprising:

a support means including a bearing means;

a pedal lever including a shaft pivotably supported by said bearing means for oscillation about the shaft axis between an idle position and off-idle positions, an actuating arm having a pedal extending from said shaft at an angle thereto for moving said shaft between said idle position and said off-idle positions, and return means acting on said pedal lever when said shaft is in said off-idle positions to urge said shaft to said idle position;

a magnet means fixed on said shaft and movable therewith to provide a movable magnetic field of varying strength in an effective zone adjacent one side of said shaft; and a magnetic field sensor fixed to said support means adjacent to said shaft in the effective zone of said magnetic field and operative to sense the variation in strength of said magnetic field at various positions of said shaft and to form a readable output signal proportional to said variations for indicating the angular position of said shaft; and further comprising an idle stop on said support means engageable by said pedal lever when said shaft is in said idle position thereby to establish said idle position, and an off-idle stop on said support means engageable by said pedal lever when said shaft is in one of said off-idle positions to limit the travel of said pedal lever.

20. A pedal module as set forth in claim 19 wherein said support means comprises a mounting bracket carrying said idle and off-idle stops, said return means being connected between said mounting bracket and said pedal lever.

* * * * *